US010997199B2

(12) United States Patent
Castaing (10) Patent No.: US 10,997,199 B2
(45) Date of Patent: May 4, 2021

(54) SYSTEMS AND METHODS FOR GEOGRAPHICALLY DISTRIBUTED DATABASE SYSTEMS

(71) Applicant: Amadeus S.A.S., Sophia Antipolis (FR)

(72) Inventor: Thibaud Nicolas Castaing, Waltham, MA (US)

(73) Assignee: Amadeus S.A.S., Sophia Antipolis (FR)

( * ) Notice: Subject to any disclaimer, the term of this patent is extended or adjusted under 35 U.S.C. 154(b) by 513 days.

(21) Appl. No.: 16/007,615

(22) Filed: Jun. 13, 2018

(65) Prior Publication Data

US 2018/0365271 A1     Dec. 20, 2018

Related U.S. Application Data

(60) Provisional application No. 62/521,341, filed on Jun. 16, 2017.

(51) Int. Cl.
*G06F 16/00*     (2019.01)
*G06F 16/27*     (2019.01)
*H04L 29/08*     (2006.01)

(52) U.S. Cl.
CPC ........... *G06F 16/27* (2019.01); *G06F 16/273* (2019.01); *H04L 67/1097* (2013.01);
(Continued)

(58) Field of Classification Search
CPC ... G06F 16/27; G06F 16/273; H04L 67/1097; H04L 67/18; H04L 67/2852; H04L 67/32
See application file for complete search history.

(56) References Cited

U.S. PATENT DOCUMENTS

2002/0116593 A1*   8/2002   Kazar ..................... G06F 16/16
                                                                           711/202
2008/0115008 A1*   5/2008   Daftardar ............ G06F 11/2089
                                                                             714/3
(Continued)

OTHER PUBLICATIONS

International Search Report and Written Opinion of the International Searching Authority received in International Application Serial No. PCT/EP2018/065719, dated Oct. 23, 2018 (14 pages).
(Continued)

*Primary Examiner* — Diedra McQuitery
(74) *Attorney, Agent, or Firm* — Finnegan, Henderson, Farabow, Garrett & Dunner, LLP (57) ABSTRACT

Computer-implemented methods and systems are provided for managing databases. Consistent with disclosed embodiments, a database system can serve configuration requests received from administration systems using an active cluster of at least two geographically separated computing clusters. Serving configuration request can include updating an active configuration database of the active cluster based on the configuration request. The system can also serve search requests received from user devices that specify a search criterion using a closest one of the geographically separated computing clusters by retrieving items satisfying the search criterion from local copies of a cache replicated across the geographically separated computing clusters. Furthermore, the system can serve transaction requests received from the user devices using the active cluster by updating an active local copy of the cache replicated in the active cluster. The active datacenter may be changed by using load balancing devices to reroute transaction and configuration requests between datacenters.

20 Claims, 6 Drawing Sheets

(52) U.S. Cl.
CPC .......... *H04L 67/18* (2013.01); *H04L 67/2852* (2013.01); *H04L 67/32* (2013.01)

(56) References Cited

U.S. PATENT DOCUMENTS

| | | |
|---|---|---|
| 2012/0124000 A1 | 5/2012 | Siddarth et al. |
| 2014/0074780 A1 | 3/2014 | Kelly |
| 2014/0379837 A1* | 12/2014 | Gasser ................ H04L 67/2847 709/213 |
| 2015/0074052 A1 | 3/2015 | Vekatachary et al. |

OTHER PUBLICATIONS

Communication pursuant to Article 94(3) from the European Patent Office in EP Application No. 18732020.5, dated Nov. 10, 2020 (8 pages).

* cited by examiner

SYSTEMS AND METHODS FOR GEOGRAPHICALLY DISTRIBUTED DATABASE SYSTEMS

CROSS-REFERENCE TO RELATED APPLICATIONS

This application claims the benefit of priority under 35 U.S.C. § 119(e) to U.S. Provisional Application No. 62/521,341, filed Jun. 16, 2017, and titled "Multi-datacenter Inventory Management," which is hereby incorporated by reference in its entirety.

TECHNICAL FIELD

The disclosed embodiments concern geographically distributed database systems for processing user requests. These systems configured to reduce inconsistencies between the contents of the geographically distributed databases. More specifically, the disclosed embodiments concern geographically distributed datacenters that process certain requests locally while other requests are routed to one or more active data centers for processing.

BACKGROUND

Users are increasingly booking accommodations and services as well as buying goods online. Inventory management systems can allow users to research and reserve inventory items in an inventory. Such systems can also allow service providers to configure an inventory by adding, removing, and modifying inventory items. Users and service providers can interact with inventory management systems by performing different operations, such as search requests, reservation requests, and configuration requests. Users and service providers may have differing tolerances for delays in processing such requests. For example, users may expect responses to search requests within 100 ms. Slower responses may be tolerated by users for reservation requests and by service providers for configuration requests. Furthermore, request volumes may also differ greatly between request types. For example, search requests may greatly outnumber reservation requests, which may in turn greatly outnumber configuration requests.

Placing datacenters for inventory management systems geographically close to users may reduce response times. But users may be geographically distributed, and so inventory management systems may require multiple datacenters. But using multiple datacenters may, in turn, create problems with double-booking and inconsistent inventory data across datacenters.

The disclosed systems and methods use a specific architecture adapted to satisfy quality of service requirements. In particular, this specific architecture relies on multiple datacenters and differentially distributes request types between datacenters. The specific technical solutions disclosed address at least the problem of satisfying user and service-provider latency expectations while reducing the potential for double-booking and data inconsistencies across datacenters. In this manner, the disclosed systems and methods improve on existing inventory management systems and overcome problems specifically arising in the realm of computer networks.

SUMMARY

The disclosed embodiments comprise systems and methods for processing requests using multiple geographically separated datacenters. In some embodiments, the multiple datacenters may include inventory information. The datacenters may be configured to provide inventor information in response to user inquiries. Inventory configuration requests and transaction requests are processed, in some aspects, by active datacenters. Load balancers in passive datacenters, in various aspects, reroute configuration and transaction requests to active datacenters to reduce the potential for incorrect booking of resources.

The disclosed embodiments include a database system. The database system can include a first datacenter and a second datacenter geographically separated from the first datacenter. The first datacenter can include a first load balancer and a first cluster implementing an active distributed cache database containing first cached information and an active configuration database containing first configuration information. The second datacenter can include a second load balancer and a second cluster implementing a passive distributed cache database containing second cached information and a passive configuration database containing second configuration information. The first load balancer and the second load balancer can be configured to receive requests from geographically separated systems. The request can include search requests, configuration requests, and transaction requests. The first load balancer and the second load balancer can be configured to provide the search requests to one of the active distributed cache database and the passive distributed cache database. The first load balancer and the second load balancer can be further configured to provide the configuration requests to the active configuration database. The first load balancer and the second load balancer can also be further configured to provide the transaction requests to the active distributed cache database.

In some aspects, the active distributed cache database can be configured to provide search results based on the first cached information. The passive distributed cache database can be configured to provide search results based on the second cached information. The active configuration database can be configured to update the first configuration information based on the configuration requests, and to push configuration updates to the active distributed cache database for updating the first cached information. The active distributed cache database can be configured to update the first cached information based on the transaction requests, and to push transaction updates to the passive distributed cache database for updating the second cached information. The passive distributed cache database can then update the second cached information based on the transaction updates, enabling cross-cache reconciliation between the active distributed cache database and the passive distributed cache database.

In some aspects, at least one of the active configuration database and the active distributed cache database can be further configured to push the configuration updates to the passive configuration database for updating the second configuration information. At least one of the passive configuration database and the active distributed cache database can be further configured to push the configuration updates to the passive distribute cache database for updating the second cached information.

In some aspects, the active distributed cache database can be further configured to push the transaction updates to the active configuration database for updating the first configuration information. In various aspects, the active configuration database can be further configured to push the transaction updates to the passive configuration database for updating the second configuration information. In certain aspects, the passive distributed cache database can further configured to push the transaction updates to the passive configuration database for updating the second configuration information.

In some aspects, the configuration requests can include at least one of adding, removing, and modifying the first cached information or the second cached information. The search requests can include one or more specified criteria for searching items in the first cached information.

In some aspects, when receiving activation instructions from an administration system, the passive distributed cache database and the passive configuration database can be activated, and the active distributed cache database and the active configuration database can be deactivated.

The disclosed embodiments include a method for processing requests. The method can include receiving a configuration request from an administration system to add or remove items at a first datacenter. The method can further include routing the configuration request to a second datacenter geographically separated from the first datacenter, the second datacenter including an active configuration database. The method can also include updating configuration information stored in the active configuration database with configuration updates based on the configuration request. The method can further include pushing the configuration updates to a passive distributed cache database in the first datacenter and an active distributed cache database in the second datacenter. The configuration requests can include at least one of adding, removing, and modifying the first cached information or the second cached information.

In some aspects, the method can further include pushing the configuration updates to a passive configuration database in the first datacenter. The method can further include receiving a search request from a user device specifying one or more search criteria at the first datacenter. The user device can be geographically closer to the first datacenter than to the second datacenter. The method can further include retrieving items satisfying the one or more search criteria from the passive distributed cache database. The method can further include providing an indication of the items to the user device.

In some aspects, the method can further include receiving a transaction request from the user device in response to the provided indication of the items at the first datacenter. The method can further include routing the transaction request to the second datacenter. The method can further include updating configuration information stored in the active distributed cache database with transaction updates based on the transaction request. The method can further include pushing the transaction updates to the passive distributed cache database. The method can further include pushing the transaction updates to the active configuration database and a passive configuration database in the first datacenter.

The disclosed embodiments include a method for providing databases. The method can include serving configuration requests received from administration systems using an active computing cluster of at least two geographically separated computing clusters by updating an active configuration database of the active computing cluster based on the configuration requests. The method can further include serving search requests received from user devices that specify one or more search criteria using a closest one of the at least two geographically separated computing clusters by retrieving items satisfying the one or more search criteria from local copies of a cache database replicated across the at least two geographically separated computing clusters. The method can also include serving transaction requests received from the user devices using the active computing cluster by updating an active local copy of the cache database replicated in the active computing cluster.

In some aspects, the method can further include replicating changes in the active configuration database on the local copies of the cache database. The method can further include replicating changes in the active local copy of the cache database on the active configuration database. The method can further include changing the active computing cluster by activating another computing cluster of the at least two geographically separated computing clusters and then deactivating the active computing cluster. In some aspects, the at least two geographically separated computing clusters are configured to serve the transaction requests and configuration requests at the closest of the active computing cluster and the other computing cluster while both of the active computing cluster and the other computing cluster are active.

It is to be understood that both the foregoing general description and the following detailed description are exemplary and explanatory only and are not restrictive of the disclosed embodiments, as claimed.

BRIEF DESCRIPTION OF THE DRAWINGS

The drawings are not necessarily to scale or exhaustive. Instead, emphasis is generally placed upon illustrating the principles of the inventions described herein. The accompanying drawings, which are incorporated in and constitute a part of this specification, illustrate several embodiments consistent with the disclosure, and together with the description, serve to explain the principles of the disclosure. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

As used herein with respect to a set, the term "and/or" and the phrase "at least one . . . and . . . " both encompass every subset of the set. For example, "accommodation items, service items, and/or goods" and "at least one of accommodation items, service items, and goods" have equivalent scope, and include either accommodation items; or service items; or goods; or accommodation items and service items; or accommodation items and goods; or service items and goods; or accommodation items, service items, and goods.

According to disclosed embodiments, a geographically distributed database system can include multiple datacenters, each having a copy of a database. This database can include, as a non-limiting example, an inventory of accommodation items, service items, and/or goods. Pushing copies of the database geographically closer to the users in this manner can reduce delays in replying to user requests. However, because reconciling the database between the multiple datacenters takes time, permitting each datacenter to reply to user requests by configuring the database or performing transactions involving the database could result in incorrect bookings. For example, in response to a user's request, a datacenter could perform transactions concerning one or more inventory items rendered unavailable by configuration changes or transactions at another datacenter. As a non-limiting example, a datacenter could book an inventory item rendered unavailable by configuration changes or transactions at another datacenter.

In some embodiments, to reduce the potential for incorrect bookings, all datacenters can handle search requests, while at least one active datacenter handles inventory configuration and transactions. For example, only a single active datacenter may handle inventory configuration and transactions. Load balancers within each datacenter are configured to route configuration and transaction requests to the at least one active datacenter.

In some embodiments, an additional datacenter can be activated by configuring the load balancers to route configuration and transactions requests to both the originally activated and newly activated datacenter. The originally activated datacenter can then be deactivated by configuring its load balancer to route configuration and transactions requests to the newly activated datacenter. In this manner, the inventory management system can reduce the potential for incorrect bookings, while enabling active datacenters to be conveniently switched with other datacenters as needed.

As used herein, an inventory can include accommodation items, service items, and/or goods. Accommodation items can include at least one of hotel, resort, and rental accommodations (e.g., rooms, cottages, houses). Service items can include at least one of travel services (e.g., airplane, train, rental vehicle, ferry, ride share reservations, bus reservations), entertainment items (e.g., tickets to plays, concerts, venues, resort activities), delivery service items (e.g., food, grocery deliveries), and restaurant service items (e.g., reservations seating, reservations for meals, prepaid meal tickets). The inventory can include package deals including accommodation items, service items, and/or goods. Such a package deal can include, for example, flight and hotel reservations, restaurant meal tickets, and/or activities vouchers. The inventory can include a certain number of items and can be updated to create items, add items, remove items, and/or modify items. As users choose, select, reserve, purchase, or otherwise claim items of accommodations, services, and/or goods, these items can become unavailable to other users. The inventory can include transaction information for the items, such as prices, loyalty program conditions, discounts, and/or information concerning inventory items. For example, for a hotel room reservation item, the inventory can specify a price, a location, a check-in time, a discount for AAA members, and/or conditions for crediting a loyalty program with points upon reservation of the hotel room.

As used herein, a configuration request can include a request to create, add, delete, and/or modify an inventory. Such a configuration request can cause a datacenter to create items in an inventory, add items to an inventory, modify inventory items, and/or remove inventory items. As a non-limiting example, a configuration request can indicate at least one of the following operations: creating or adding one or more items to the inventory, changing prices and availabilities for one or more inventory items, and deleting one or more inventory items from the inventory. A configuration request can be provided to the system of the disclosed embodiments using an HTML form, an XML message (e.g., a SOAP object), a JSON object, an HTTP request message, an SMTP message, or another message format.

As used herein, a search request can include a query for inventory items that satisfy specified criteria. For example, a search request for flights may specify at least one of a desired origin and destination of the flight, date of the flight, time of the flight, connections during the flight, seat class, and similar criteria. As an additional example, a search request for a hotel room may describe at least one of a desired city or location, check-in time, check-out time, room type, smoking or non-smoking status, and similar criteria. A search request can be provided to the system of the disclosed embodiments using an HTML form, an XML message (e.g., a SOAP object), a JSON object, an HTTP request message, an SMTP message, or another message format.

As used herein, a transaction request can include a request to purchase, reserve, or otherwise claim inventory items. The transaction request can include payment information and user information, as necessary to purchase, reserve, or otherwise claim the items in inventory. For example, a full name and credit card number may be required to reserve a hotel room; a full name, credit card number, and billing address may be required to purchase a seat on a flight; a full name, credit card number, billing address, and driver's license number may be required to reserve a car; a full name, credit card number, mailing and billing addresses, and a cell phone number may be required to buy services or goods; and a name may be required to reserve seating at a restaurant. A transaction request can also include information identifying the desired item(s) in the inventory. A transaction request can be provided to the system of the disclosed embodiments using an HTML form, an XML message (e.g., a SOAP object), a JSON object, an HTTP request message, an SMTP message, or another message format.

As would be recognized by one of skill in the art, the distance between two computing locations can result in a communication delay between when a signal is provided by the first computing location and when the signal is received by the second communication device. As used herein, "geographically separated" means being separated by a distance resulting in a communication delay greater than 10 milliseconds. As would be appreciated by one of skill in the art, the permissible communication delay may depend upon the purpose, application, and/or content of the signal. For example, communication delays of 100 milliseconds or more may be acceptable for communication between user devices and text-oriented websites like blogs, online newspapers, and magazines. Lesser delays may be required for search engines and websites making extensive use of images, scripts, and interactive elements. As also used herein, a first system is "closer" to a second system than to a third system when the communication delay between the first system and the second system is less than the communication delay between the first system and the third system. The communication delay may be specified as a minimum communication delay or an expected communication delay, and may be measured or estimated according to known methods.

Figure 1:
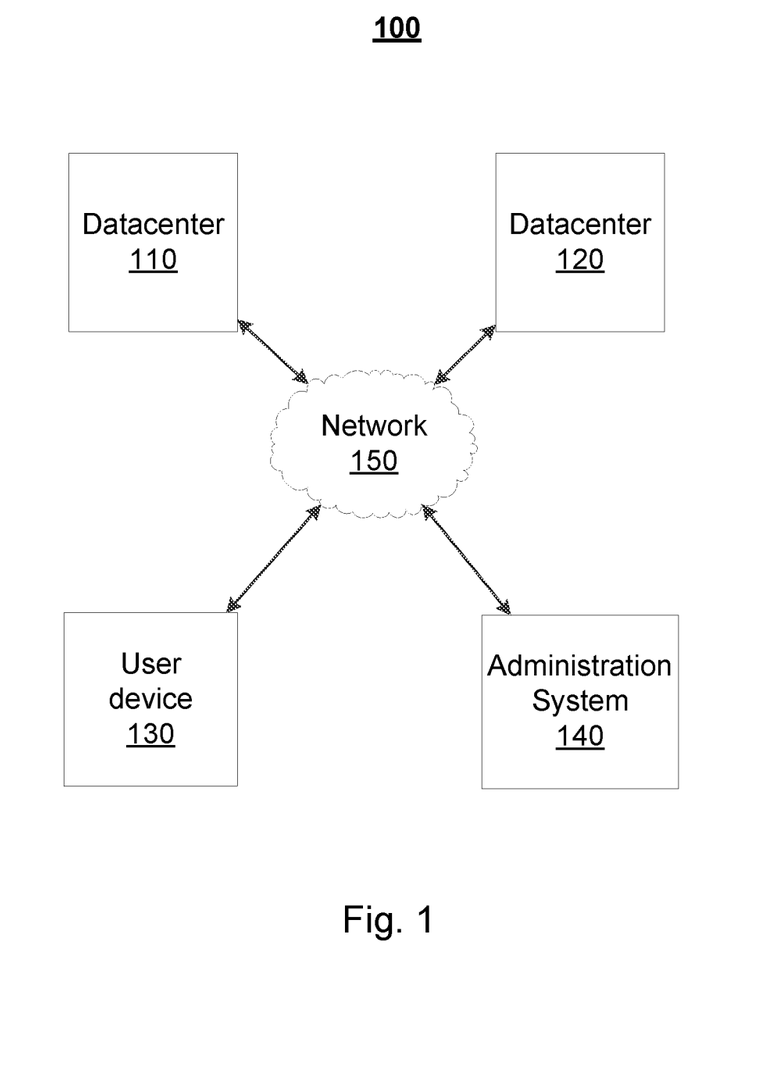
FIG. 1 depicts a database system comprising multiple datacenters.

FIG. 1 depicts a database system 100 comprising multiple datacenters, consistent with disclosed embodiments. As shown in FIG. 1, system 100 uses multiple, geographically separated datacenters (e.g., datacenter 110 and datacenter 120) to ensure that user devices (e.g., user device 130) can access system 100 without incurring substantial communication delays. For example, system 100 can be configured such that user device 130 accesses a copy of the inventory stored in a datacenter geographically closer to user device 130. In some aspects, system 100 can be accessed by user devices (e.g., user device 130) and administration systems (e.g., administration system 140).

As shown in FIG. 1, the components of system 100 can communicate with each other and with other systems (such as other user devices and administration systems) using network 150. As a non-limiting example, the components of system 100 communicate with each other or with other systems using a SOAP object, a JSON object, an XML message, a remote procedure call, an HTTP request message, an SMTP message, or a message in another similar protocol.

The geographically separated datacenters (e.g., datacenter 110 and datacenter 120) can each include one or more facilities used to house computing systems, such as servers. According to methods known to one of skill in the art, the facilities can include support systems, such as electrical systems, power systems, security systems, and cooling systems for the computing systems. The facilities can also include data storage devices for storing the inventory and configuration of the inventory.

User device 130 can include computing devices, such as smart watches, smart phones, tablets, netbooks, notebooks, laptops, desktops, workstations, wearable electronic devices, smart electric appliances, and servers. User device 130 can be configured to interact with a user, for example, through a known input/output device and/or a graphical user interface. In some embodiments, user device 130 can enable a user to access a reservation system, a property management system, or an inventory management system. User device 130 can enable this access through, for example, a web browser, an application, or a client program.

Administration system 140 can include one or more computing devices, such as smart watches, smart phones, tablets, netbooks, notebooks, laptops, desktops, workstations, and servers. Administration system 140 may be standalone, or it may be part of a subsystem, which may be part of a larger system. For example, administration system 140 may be associated with a commercial institution that provides search and booking services. Administration system 140 can include distributed servers that are remotely located and communicate with other systems of the commercial institution over a public network or over a dedicated private network. Administration system 140 can be configured to interact with a user, for example, through a known input/output device and/or a graphical user interface. In some embodiments, administration system 140 can enable a user to access to a reservation system, a property management system, or an inventory management system. For example, administration system 140 can host the reservation system, the property management system, or the inventory management system; or run an application (e.g., a web browser or client program) that allows the user to access the reservation system, the property management system, or the inventory management system hosted on another computing system.

Network 150 may be configured to provide communications between the components of system 100 depicted of FIG. 1. For example, network 150 may be any type of network (including infrastructure) that provides communications, exchanges information, and/or facilitates the exchange of information, such as the Internet, a Local Area Network, cellular networks, wireless local area networks (WLANs), wireless sensor networks, satellite communication networks, or other suitable connection(s) that enables the components of system 100 to communicate with each other and with other systems (such as user devices and administration systems).

Figure 2:
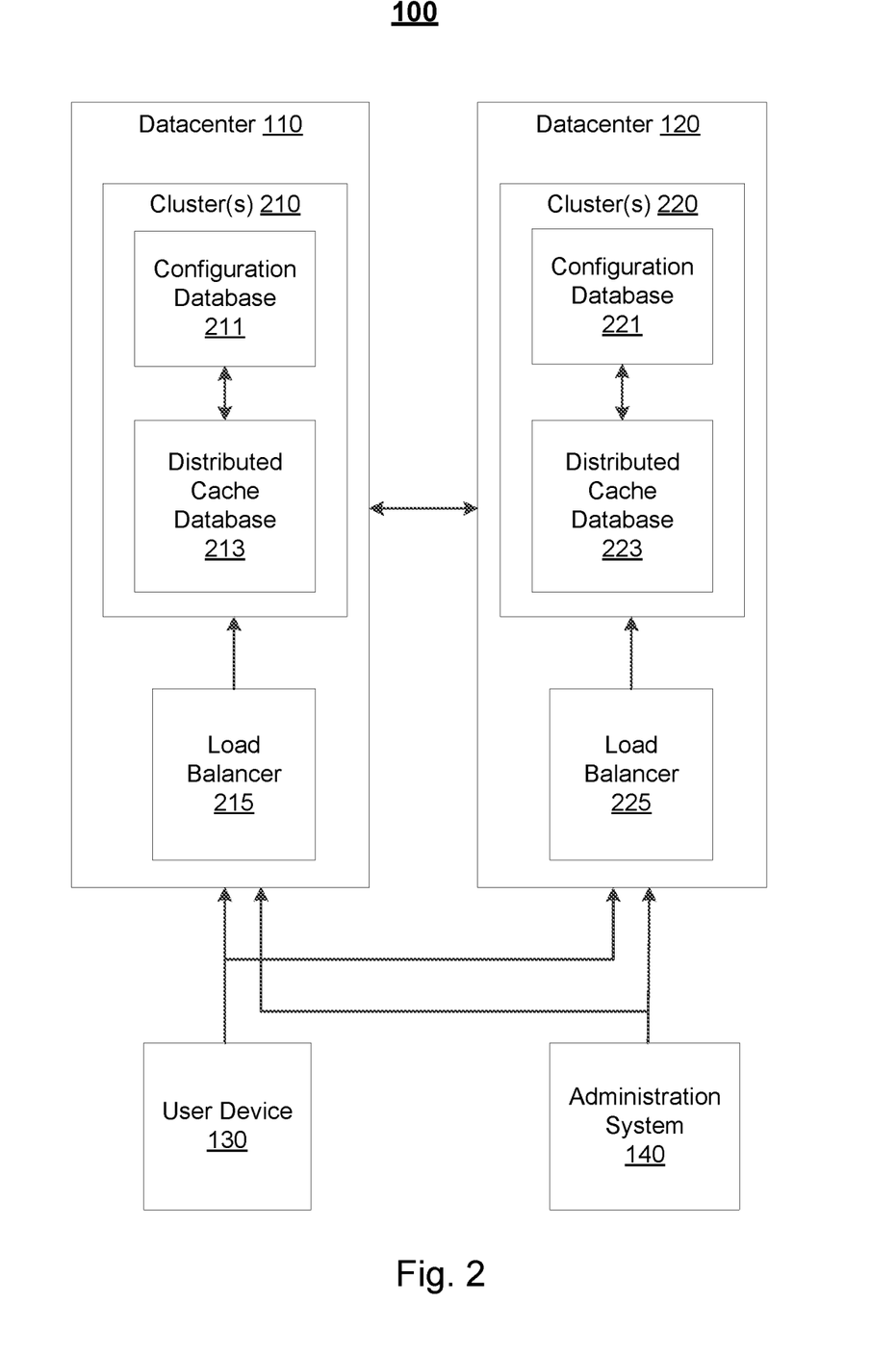
FIG. 2 depicts an exemplary schematic of two datacenters.

FIG. 2 depicts an exemplary schematic of two datacenters (e.g., datacenters 110 and 120), consistent with disclosed embodiments. As shown, each datacenter can include a load balancer (e.g., load balancer 215 and load balancer 225) and one or more clusters (e.g., cluster(s) 210 and cluster(s) 220). The load balancer can be implemented as a physical device, as a virtual machine, or as a combination of a virtual machine and physical device. Non-limiting examples of such a load balancer include the F5 load balancer offered by BIG-IP, the KEMP Load Balancer, and the BARRACUDA Load Balancer. In some embodiments, the load balancer can be configured to route traffic across the servers comprising the cluster. The load balancer can also be configured to route traffic from one cluster to another. For example, when a datacenter is configured to be passive, the load balancer for that datacenter can be configured to route transaction requests and configuration requests to an active datacenter, or to the closest active datacenter when more than one datacenter is active. In some embodiments, the load balancers of system 100 can be configured to communicate with the datacenters and/or between each other to ensure that traffic is sent to the correct datacenter. For example, a load balancer that receives a transaction request or a configuration request can be configured to query the status of one or more datacenters and identify the closest active datacenter based on the response to this query.

The cluster(s) can comprise one or more servers configured to participate in one or more operate cloud computing platforms. For example, the cluster(s) can implement a software deployment and management system, such as OPENSHIFT, KUBERNETES, CLOUDWAYS, AMAZON WEB SERVICES, GOOGLE COMPUTE, or a similar system. In some embodiments, the cluster(s) in each datacenter can be configured to implement a distributed cache database (e.g., distributed cache database 213 and distributed cache database 223) and a configuration database (e.g., configuration database 211 and configuration database 221). In various embodiments, the cluster(s) in each datacenter can implement the distributed cache database, but not the configuration database, which may be implemented on a system external to the cluster(s) but part of the datacenter, external to the datacenters (for example, on another computing system) but part of system 100, or external to system 100.

The distributed cache databases (e.g., distributed cache database 213 and distributed cache database 223) can be configured to provide rapid responses to search requests and transaction requests. For example, the distributed cache databases can use a database system such as COUCHBASE, MEMCACHED, REDIS, or a similar system to ensure that the inventory is stored in-memory. As used herein, the distributed cache databases can include persistent or non-volatile storage in addition to in-memory storage, and can use known processes or methods to replicate the in-memory storage in the persistent or non-volatile storage. System 100 can be configured to route search requests from the user devices to the distributed cache databases to minimize the delay between receiving the request and providing a response.

The distributed cache databases can be configured to provide a single update location (e.g., a single datacenter) for transaction requests. For example, system 100 can include at least one (but generally only one) active datacenter at any time. System 100 can be configured to route transaction requests to the at least one active datacenter. The remaining datacenters can be passive and may not process transaction requests. Thus, system 100 can minimize the possibility of different datacenters creating conflicting claims to the same inventory for different users.

The distributed cache databases can be configured to ensure consistency between each of the distributed cache databases and the configuration databases. In some embodiments, the distributed cache database can be configured for cross-cluster reconciliation. For example, each distributed cache database can be configured to push transaction information to other distributed cache databases for updating the inventory stored in those databases. In various embodiments, the distributed cache databases can be configured to update the configuration databases. For example, inventory updates resulting from transaction requests can be pushed to the configuration databases to ensure that these databases accurately reflect the available inventory.

The configuration databases (e.g., configuration database 211 and configuration database 221) can be configured for ease-of-use and/or compatibility with existing systems. In some embodiments, the configuration databases can include relational databases (e.g., MICROSOFT ACCESS, MICROSOFT SQL SERVER, 4D (4TH DIMENSION), APACHE DERBY, CUBRID, EXASOLUTION, FILEMAKER, MYSQL), or object-relational databases (e.g., ORACLE DATABASES, MICROSOFT SQL SERVER, ADAPTIVE SERVER ENTERPRISE, CUBRID, DB2, INFORMIX, POSTGRESQL).

The configuration databases can be configured to buffer inventory updates, reducing the likelihood that such updates affect the ability of the distributed cache databases to respond to search and transaction requests. For example, system 100 can route configuration requests to the configuration databases, and then system 100 can push updates of the configuration databases to the distributed cache databases. In this manner, system 100 can prevent immediate, substantial changes to inventory from requiring correspondingly immediate, substantial changes to the distributed cache databases. Instead, using the configuration database to buffer inventory updates allows efficient implementation of these updates. For example, the updates can be divided or combined into batches. The distributed cache databases can be updated using these batches at regular intervals or during times of low system usage.

The configuration databases can also be configured to provide a single update location (e.g., a single datacenter) for configuration requests. As described in the above example, system 100 can include at least one (but generally only one) active datacenter at any time. System 100 can be configured to route configuration requests to the at least one active datacenter. The remaining datacenters are passive (and may not process configuration requests). Thus, system 100 can minimize the possibility of different datacenters creating incompatible changes to inventory.

Figure 3:
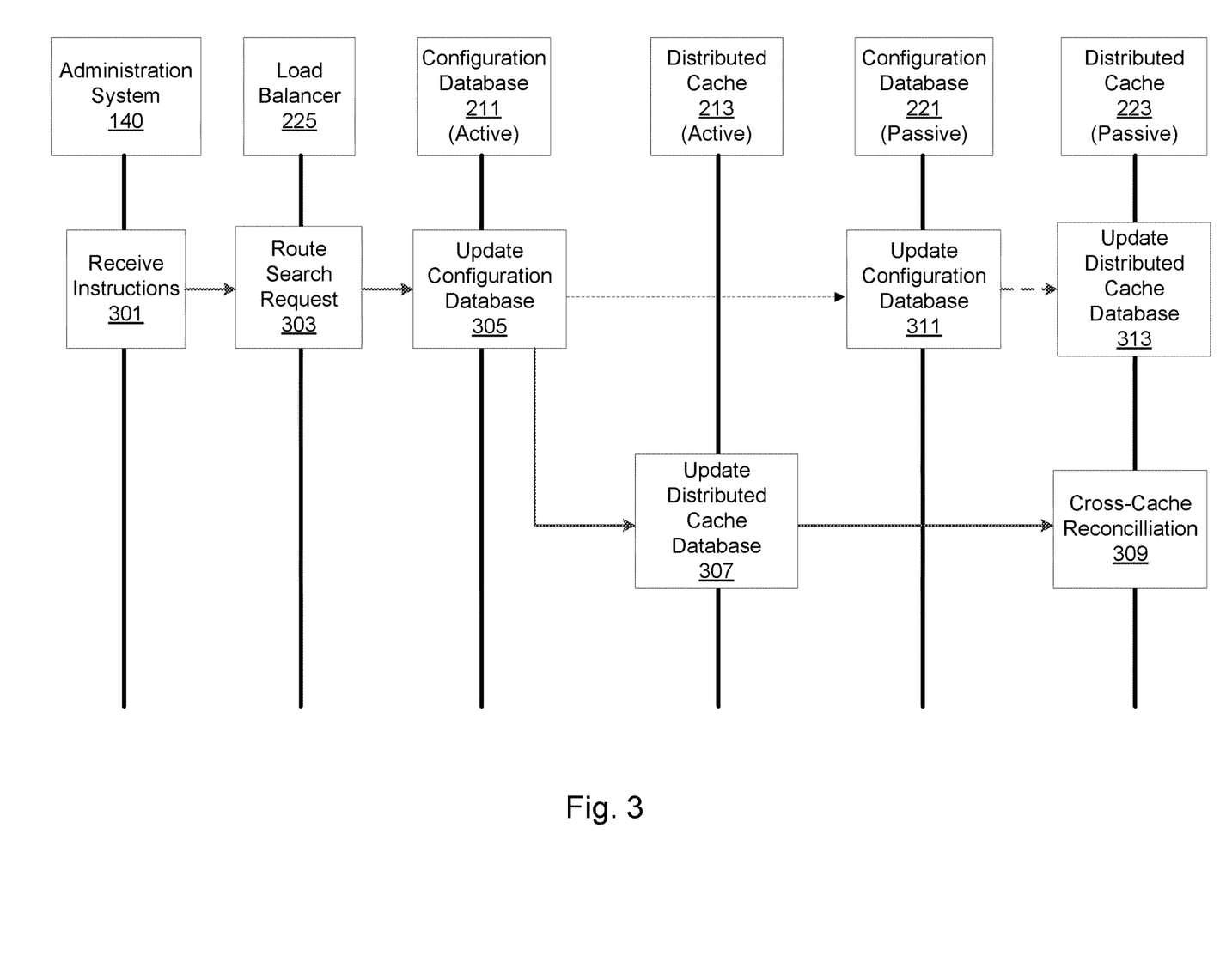
FIG. 3 depicts an exemplary flowchart illustrating processing of a configuration request.

FIG. 3 depicts an exemplary flowchart illustrating processing of a configuration request, consistent with disclosed embodiments. In step 301, administration system 140 can receive instructions to configure the inventory. Administration system 140 can receive these instructions by interacting with a user through an I/O device and a graphical user interface, through an exposed application programming interface (e.g., a web service), or through another interaction method. Administration system 140 can generate a configuration request based on the instructions. This configuration request may indicate the addition, deletion, and/or removal of one or more inventory items, as previously described. Administration system 140 can provide the configuration request to the closest datacenter (e.g., datacenter 120).

In step 303, load balancer 225 of datacenter 120 can receive the configuration request and route it to the appropriate datacenter. For example, when a configuration request is received at a passive datacenter, the load balancer for the datacenter can route the request to an active datacenter. In this example, datacenter 120 is currently passive, and therefore configuration requests received by load balancer 225 of datacenter 120 are routed to datacenter 110. Accordingly, configuration database 211 of datacenter 110 can receive configuration requests through one or more load balancers (e.g., load balancer 215 and load balancer 225). In various embodiments, configuration database 211 can receive the configuration request directly from administration system 140. In step 305, configuration database 211 can use the configuration request to update inventory information stored in configuration database 211, according to known methods In step 307, datacenter 110 can be configured to push updates from configuration database 211 to distributed cache database 213. For example, datacenter 110 can be configured to run one or more background processes that copy updates from configuration database 211 to distributed cache database 213. As described herein, datacenter 110 may push the updates to distributed cache database 213 using a SOAP object, a JSON object, an XML message, a remote procedure call, an HTTP request message, an SMTP message, or a message in another similar protocol.

In step 309, datacenter 110 can be configured to push configuration updates from distributed cache database 213 to distributed cache database 223. For example, distributed cache database 213 of datacenter 110 can be configured to copy configuration updates from distributed cache database 213 to distributed cache database 223 using a cross-cluster reconciliation method (e.g., as implemented by COUCHBASE and similar databases). Distributed cache database 223 can use these configuration updates to update the inventory information stored in distributed cache database 223. In this manner, datacenter 110 can enable cross-cache reconciliation between distributed cache database 213 and distributed cache database 223.

In some embodiments, in step 311, datacenter 110 can be configured to push configuration updates from configuration database 211 to configuration database 221. Configuration database 221 may use these configuration updates to update the inventory information stored in configuration database 221. In such embodiments, in step 313, datacenter 120 can also push configuration updates from configuration database 221 to distributed cache database 223.

Figure 4:
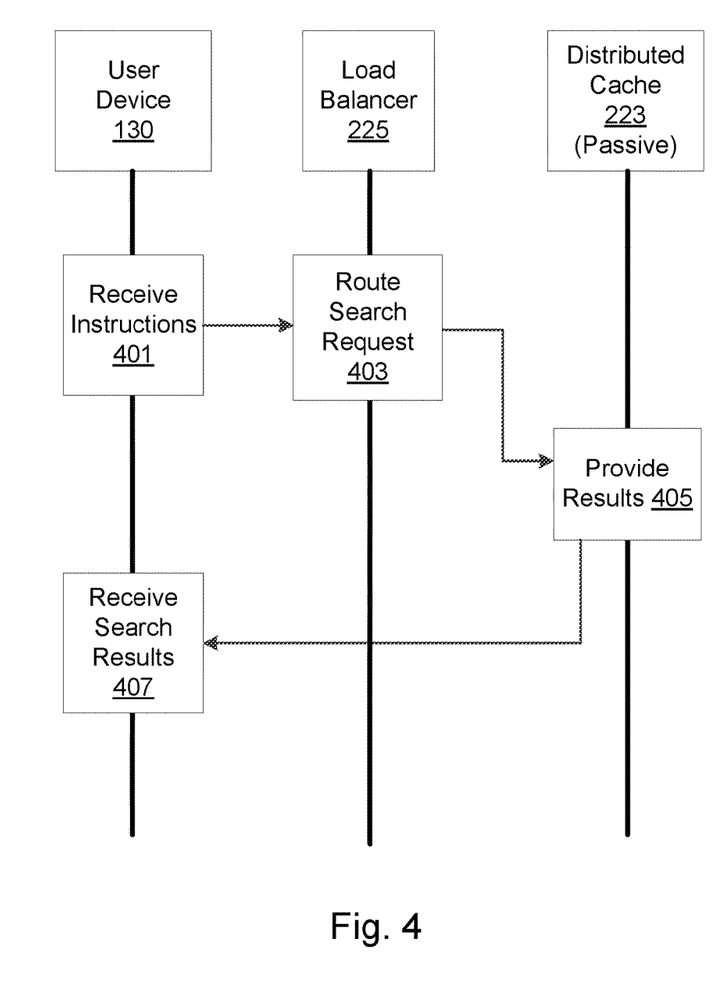
FIG. 4 depicts an exemplary flowchart illustrating processing of a search request.

FIG. 4 depicts an exemplary flowchart illustrating processing of a search request, consistent with disclosed embodiments. In step 401, user device 130 can receive instructions to search the inventory. Similar to the description above with regard to step 301, user device 130 can be configured to receive these instructions by interacting with a user through an I/O device and a graphical user interface, through an exposed application programming interface (e.g., a web service or an application), or through another method. User device 130 can generate a search request based on the instructions. This search request may specify search criteria for inventory items, as previously described. User device 130 can provide the search request to the closest datacenter (e.g., datacenter 120).

In step 403, load balancer 225 of datacenter 120 can receive the search request and route it to distributed cache database 223. In contrast to configuration requests, search requests may not be routed to the active datacenters (e.g., datacenter 110), reducing the delay in providing search results. Furthermore, in some embodiments, search results may not change the inventory stored in the distributed cache databases and therefore may not require a single update location (e.g., a single active datacenter).

In step 405, distributed cache database 223 of datacenter 120 can identify the search results that satisfy the search criteria and push the search results to user device 130. In step 407, user device 130 can receive the search results provided by distributed cache database 223. Step 407 may further include displaying the search results to the user through a graphical user interface. The user may further adjust the search criteria and initiate a new search request based on the search results.

Figure 5:
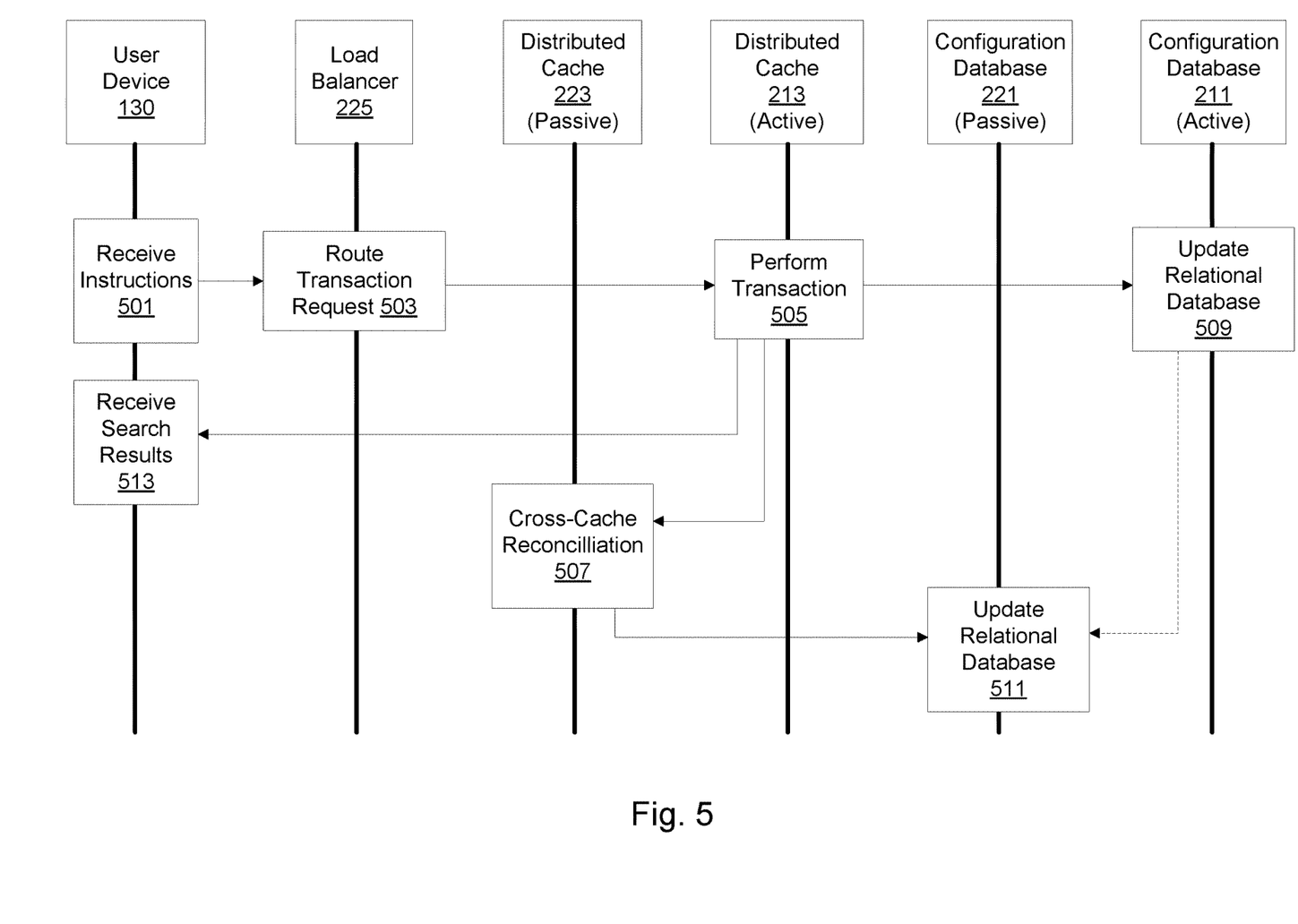
FIG. 5 depicts an exemplary flowchart illustrating processing of a transaction request.

FIG. 5 depicts an exemplary flowchart illustrating processing of a transaction request, consistent with disclosed embodiments. In step 501, user device 130 can receive transaction instructions. In a manner similar to that described above with regard to configuration requests and search requests in steps 301 and 401, user device 130 can be configured to generate a transaction request and provide the transaction request to the closest datacenter. The transaction request can indicate one or more inventory items that a user wishes to claim, as previously described. As described above, the transaction request may further include payment information and user information.

In step 503, load balancer 225 of the closest datacenter (e.g., datacenter 120) can route the transaction request to an active datacenter (e.g., datacenter 110), as described above with regards to step 303.

In step 505, distributed cache database 213 of active datacenter 110 can receive the transaction request. Distributed cache database 213 can use the transaction request to update the inventory information stored in distributed cache database 213. For example, distributed cache database 213 can change the inventory information stored in distributed cache database 213 to indicate that the claimed transaction items are currently unavailable to other users, as previously described. For example, distributed cache database 213 can remove the claimed transaction items from distributed cache database 213.

In step 507, datacenter 110 can be configured to push the transaction request from distributed cache database 213 to distributed cache database 223, as previously described with regards to step 309. Distributed cache database 223 can then use the transaction request to update the inventory information stored in distributed cache database 223. In this manner, datacenter 110 can enable cross-cache reconciliation between distributed cache database 213 and distributed cache database 223.

In step 509, datacenter 110 can push transaction updates from distributed cache database 213 to configuration database 211. For example, datacenter 110 can be configured to run background processes that copy transaction updates from distributed cache database 213 to configuration database 211.

In step 511, datacenter 120 can push transaction updates from distributed cache database 223 to configuration database 221. For example, datacenter 110 can be configured to run one or more background processes that copy transaction updates from distributed cache database 223 to configuration database 221. Additionally or alternatively, in some embodiments, configuration database 211 can be configured to push transaction updates to configuration database 221. Configuration database 221 may use these transaction updates to update inventory information stored in configuration database 221.

Figure 6:
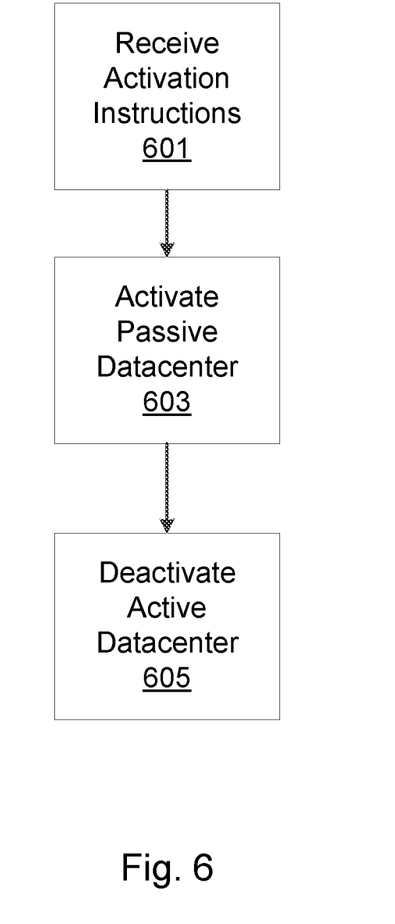
FIG. 6 depicts an exemplary flowchart illustrating changing the active datacenter.

FIG. 6 depicts an exemplary flowchart illustrating changing the active datacenter, consistent with disclosed embodiments. In step 601, system 100 can receive instructions specifying a second datacenter to activate (e.g., datacenter 120). The instructions may be received from administration system 140 or other computing systems external to system 100.

In step 603, system 100 can be configured to activate the specified passive datacenter. For example, system 100 can provide reconfiguration instructions to a load balancer for the second datacenter (e.g., load balancer 225 for datacenter 120). According to these instructions, load balancer 225 can be reconfigured to route configuration and transaction requests to the newly activated datacenter, e.g., datacenter 120.

In step 605, after the second passive datacenter (e.g., datacenter 120) is activated, system 100 can provide reconfiguration instructions to the load balancer for the originally active datacenter (e.g., load balancer 215 of datacenter 110). According to these instructions, load balancer 215 can be reconfigured to route configuration and transaction requests to the newly activated datacenter, e.g., datacenter 120. In this manner, a new datacenter can be activated and the prior active datacenter deactivated. In this embodiment, both datacenters can be active for a period of time. This may result in overbooking, as multiple transaction requests for the same inventory item may be received at different active datacenters before the distributed cache databases for these datacenters can be reconciled. But such overbooking may be infrequent and may be preferable to refusing incoming configuration and/or transaction requests when switching active datacenters.

As described herein, the configuration databases and distributed cache databases on the datacenters of system 100 include data structures and instructions stored in a non-transitory computer-readable medium, which when executed, cause one or more processors to perform the steps or functions consistent with embodiments of the present disclosure. Examples of a computer-readable storage medium include, but are not limited to, a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a cache, a register, a compact disc read-only memory (CD-ROM), or any other non-transitory computer-readable medium that may be used to store information capable of being accessed by a computer device.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims. Furthermore, although aspects of the disclosed embodiments are described as being associated with data stored in memory and other tangible non-transitory computer-readable storage media, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above-described examples, but instead are defined by the appended claims in light of their full scope of equivalents.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A database system comprising:
   a first datacenter including a first load balancer and a first cluster implementing an active distributed cache database containing first cached information and an active configuration database containing first configuration information;
   a second datacenter geographically separated from the first datacenter, the second datacenter including a second load balancer and a second cluster implementing a passive distributed cache database containing second cached information and a passive configuration database containing second configuration information;
   wherein the first load balancer and the second load balancer are configured to receive requests from geographically separated systems, the requests comprising search requests, configuration requests, and transaction requests, and provide (i) the search requests to one of the active distributed cache database and the passive distributed cache database, (ii) the configuration requests to the active configuration database, and (iii) the transaction requests to the active distributed cache database;
   wherein the active distributed cache database is configured to provide search results based on the first cached information and wherein the passive distributed cache database is configured to provide search results based on the second cached information;
   wherein the active configuration database is configured to update the first configuration information based on the configuration requests, and to push configuration updates to the active distributed cache database for updating the first cached information;
   wherein the active distributed cache database is configured to update the first cached information based on the transaction requests, and to push transaction updates to the passive distributed cache database for updating the second cached information.

2. The database system of claim 1, wherein at least one of the active configuration database and the active distributed cache database is further configured to push the configuration updates to the passive configuration database for updating the second configuration information.

3. The database system of claim 1, wherein at least one of the passive configuration database and the active distributed cache database is further configured to push the configuration updates to the passive distribute cache database for updating the second cached information.

4. The database system of claim 1, wherein the active distributed cache database is further configured to push the transaction updates to the active configuration database for updating the first configuration information.

5. The database system of claim 1, wherein the active configuration database is further configured to push the transaction updates to the passive configuration database for updating the second configuration information.

6. The database system of claim 1, wherein the passive distributed cache database is further configured to push the transaction updates to the passive configuration database for updating the second configuration information.

7. The database system of claim 1, wherein the configuration requests include at least one of adding, removing, and modifying the first cached information or the second cached information.

8. The database system of claim 1, wherein the search requests include a criterion for searching items in the first cached information.

9. The database system of claim 1, wherein when receiving activation instructions from an administration system, the passive distributed cache database and the passive configuration database are activated, and the active distributed cache database and the active configuration database are deactivated.

10. A method of processing requests, comprising:
    receiving a configuration request from an administration system to at least one of add, remove, and modify items at a first datacenter;
    routing the configuration request to a second datacenter geographically separated from the first datacenter, the second datacenter including an active configuration database;
    updating configuration information stored in the active configuration database with configuration updates based on the configuration request;
    pushing the configuration updates to a passive distributed cache database in the first datacenter and an active distributed cache database in the second datacenter.

11. The method of claim 10, further comprising pushing the configuration updates to a passive configuration database in the first datacenter.

12. The method of claim 10, further comprising:
    receiving, at the first datacenter, a search request from a user device that includes a search criterion;
    retrieving items satisfying the search criterion from the passive distributed cache database; and
    providing an indication of the items to the user device.

13. The method of claim 12, wherein the user device is geographically closer to the first datacenter than to the second datacenter.

14. The method of claim 12, further comprising:
    receiving a transaction request from the user device in response to the provided indication of the items at the first datacenter;
    routing the transaction request to the second datacenter;
    updating configuration information stored in the active distributed cache database with transaction updates based on the transaction request; and
    pushing the transaction updates to the passive distributed cache database.

15. The method of claim 13, further comprising pushing the transaction updates to the active configuration database and a passive configuration database in the first datacenter.

16. The database system of claim 1, wherein the configuration requests include at least one of adding, removing, and modifying the first cached information or the second cached information.

17. A method of providing database services comprising:
serving configuration requests received from administration systems using an active computing cluster of at least two geographically separated computing clusters by updating an active configuration database of the active computing cluster based on the configuration requests;
serving search requests received from user devices that specify a search criterion using a closest one of the at least two geographically separated computing clusters by retrieving items satisfying the search criterion from local copies of a cache replicated across the geographically separated computing clusters; and
serving transaction requests received from the user devices using the active computing cluster by updating an active local copy of the cache database replicated in the active computing cluster.

18. The method of claim 17, further comprising replicating changes in the active configuration database on the local copies of the cache database.

19. The method of claim 17, further comprising replicating changes in the active local copy of the cache database on the active configuration database.

20. The method of claim 17, further comprising changing the active computing cluster by activating another computing cluster of the at least two geographically separated computing clusters and then deactivating the active computing cluster, wherein the at least two geographically separated computing clusters are configured to serve the transaction requests and configuration requests at the closest of the active computing cluster and the other computing cluster while both of the active computing cluster and the other computing cluster are active.

* * * * *